United States Patent

Honegger

[11] Patent Number: 6,070,391
[45] Date of Patent: *Jun. 6, 2000

[54] METHOD FOR PRODUCING PRINTED PRODUCTS AND PRODUCTS PRODUCED THEREBY

[75] Inventor: Werner Honegger, Bäch, Switzerland

[73] Assignee: Ferag AG, Hinwil, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/875,686
[22] PCT Filed: Jan. 23, 1996
[86] PCT No.: PCT/CH96/00031
§ 371 Date: Sep. 11, 1997
§ 102(e) Date: Sep. 11, 1997
[87] PCT Pub. No.: WO96/23665
PCT Pub. Date: Aug. 8, 1996

[30] Foreign Application Priority Data

Feb. 1, 1995 [CH] Switzerland ............ 00269/95

[51] Int. Cl.[7] ................................... B41F 13/54
[52] U.S. Cl. ............... 53/411; 53/131.2; 53/131.4
[58] Field of Search .......... 53/411, 460, 131.5, 53/131.2, 131.4; 493/411, 413, 374; 270/39.01, 40, 1.01, 58.07, 1.02; 283/34, 35, 63.1; 412/8

[56] References Cited

U.S. PATENT DOCUMENTS

| | | | |
|---|---|---|---|
| 1,363,081 | 12/1920 | Brown | 283/62 |
| 1,670,254 | 5/1928 | Gowin | 281/15.1 |
| 3,808,768 | 5/1974 | Dobbs | 53/460 |
| 3,845,698 | 11/1974 | Scholle | 493/216 |
| 3,983,679 | 10/1976 | Zemke | 53/460 |
| 3,998,138 | 12/1976 | Walters | 493/233 |
| 4,149,711 | 4/1979 | Jackson | 270/57 |
| 4,189,895 | 2/1980 | Volkert | 53/429 |
| 4,538,833 | 9/1985 | Trikilis | 281/2 |
| 4,758,021 | 7/1988 | Fukuda | 281/15.1 |
| 4,900,001 | 2/1990 | Lapeyre | 270/1.01 |
| 4,939,888 | 7/1990 | Katz | 53/411 |
| 5,025,610 | 6/1991 | Graushar | 53/411 |
| 5,114,291 | 5/1992 | Hefty | 412/8 |
| 5,409,441 | 4/1995 | Muscoplat | 493/223 |
| 5,538,232 | 7/1996 | Long | 270/1.03 |

OTHER PUBLICATIONS

Bell & Howell Baumfolder Imposition Manual, Model 433, Oct. 1996.

*Primary Examiner*—Peter Vo
*Assistant Examiner*—James P. Calve
*Attorney, Agent, or Firm*—Walter C. Farley

[57] ABSTRACT

In a method for producing a predetermined sequence of printed products with varying contents and varying numbers of pages, the pages of a printed product of the sequence are printed onto both sides of a quasi-endless paper web [P] in the form of at least one row of juxtaposed printed pages. The pages of the next printed product in the sequence are then printed in the same manner. The paper web is folded perpendicular to its length in alternating directions between the pages to be printed, or the printed pages, before or after printing. The web is then separated or brought into an easily separable condition along lines perpendicular to its length between groups of printed pages forming successive printed products. A sequence of Leporello-shaped printed products [5] is produced which can be further processed into differently shaped products. By mixing the data specific to the type of printed product to be produced with data specific to individual specimens of the product, the contents of the products of the sequence can be individualized to choice.

10 Claims, 4 Drawing Sheets

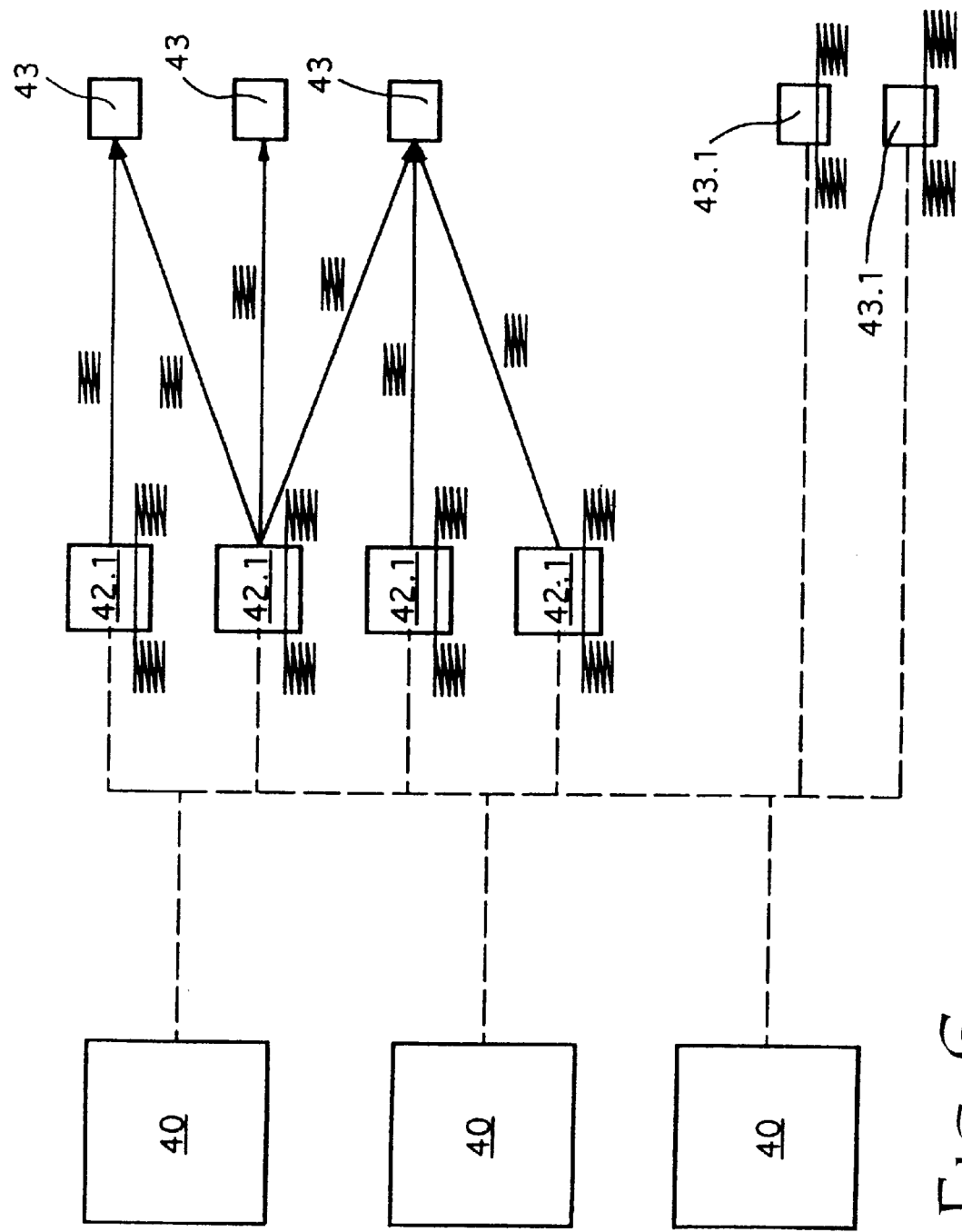

METHOD FOR PRODUCING PRINTED PRODUCTS AND PRODUCTS PRODUCED THEREBY

FIELD OF THE INVENTION

This invention is in the field of printing technology and of the post-printing or further processing of printed material for producing printed products. It particularly concerns a method for producing newspapers and magazines.

BACKGROUND OF THE INVENTION

According to the state of the art, printed products, in particular printed products of large editions, are produced by forming at least one printing mold in the form of e.g. a plate or cylinder in a first method step; by printing on paper in form of sheets or a quasi-endless paper web with the printing mold in a second step; and by producing multi-page printed products [possibly also printed products with only one page] such as, e.g., newspapers, magazines, brochures, books, etc. in a third step comprising different steps of further processing such as folding, cutting, collecting, stitching, binding and/or gluing. Furthermore, for the distribution of the finished printed products, they are individually or in groups packed and equipped with addresses and packing slips.

When printing with printing molds, the mold is normally pressed onto the paper again and again in succeeding printing processes or it is rolled over the paper, whereby the size of the printing pattern repeated again and again due to the printing process is given by the size of the printing mold. For a printing mold in the form of a cylinder which rolls over a quasi endless paper web, the printing pattern repeated on the paper web is maximally of the same width as the printing mold or the paper web and as long as the circumference of the printing mold. In book printing, usually printing molds are used which correspond to eight pages, such that a sheet printed on both sides corresponds to sixteen book pages [eight sheets].

In order to print a further printing pattern, not only an additional printing mold must be produced but the molds must also be exchanged on the printing machine. The printing method with printing molds is the more efficient the larger the number is of the specimen to be printed with the same printing mold and it is the most efficient if all these specimens are printed in immediate succession.

If a printed product is to be produced with printing molds in a very large edition wherein the size of the product is such that it can only be printed with a plurality of different printing molds, this means that either a plurality of printing machines corresponding to the number of the necessary printing molds is to be employed and the outputs of these machines are to be further processed in parallel, or it requires successive printing with different molds and intermediate storage of the output substantially until the printing process has been completed, followed by subsequent production of the finished printed products. Obviously the first method requires a lot of investment while the latter requires a lot of time. Intermediate forms of the two methods described above are of course also common.

Recently, especially in the field of newspapers and magazines, demands for reducing the actual size of an edition, i.e. the number of absolutely identical products to be produced, have increased. These demands reach from region-specific or interest-specific editions to totally individualized single products and from copies consisting of a selection of different sections [e.g. same contents with different covers or different supplements] to copies with different contents [e.g. individual selection of articles or individual advertising sections]. This kind of demand can be met to a certain degree with the methods described above, but this obviously leads to a considerable decrease in efficiency.

In order to be able to realize the smaller editions as demanded and the higher individualization of the single copy using the methods described above but with a tolerable loss of efficiency, in a current development it is tried to organize the further processing of printed products and in particular to design, to control and to couple devices for further processing in such a way that flexibility is increased and production of products which are individualized to a higher degree becomes possible without changing the actual printing method. This development leads to systems as they are e.g. described in publication EP-0511159 or U.S. Pat. No. 5,280,895 and in the publication DE-19524912.

Newspapers and magazines which have actually been printed as an edition of identical copies can, e.g., be made ready for mailing by means of the following steps of further processing: inserting of supplements compiled according to the addressee, which supplements can at least partly comprise addressee-specific information printed by a specially provided printer [e.g. answering cards with individual sender's address], additional individual printing on the inside or outside [e.g. individual address], individual packing or packing in groups depending on the address for which collected packages such as address sheets and packing slips are produced with a further printer. Individualized newspapers can also be compiled in a sequence corresponding to a postal route and packed to form collected packages. The cost regarding software and control for such methods, however, is obviously considerable.

It is also foreseen that this kind of system will reach limits regarding the achievable degree of flexibility and specimen individualization such that the demand as named above will not be able to be fulfilled indefinitely.

SUMMARY OF THE INVENTION

For this reason, an object of the invention is to provide a method for production of a pre-determined sequence of printed products, especially of multi-page products, which method is applicable way beyond the limits of known systems regarding flexibility and possibilities for specimen individualization, and with which method almost any pre-determinable sequence of almost any kind of different individualized copies of newspapers and magazines with any number of pages can be produced without a substantial loss of efficiency.

The fundamental idea of the inventive method consists in consistently exploiting the flexibility made possible by digital printing. As virtual "printing molds" are actually constantly prepared anew in digital printing methods, the flexibility of such methods is multiply larger than the flexibility of printing methods which use real printing molds. In the inventive method the material which is printed and the further processing of the printed material into finished printed products are consistently adapted to this high flexibility.

The term "digital printing" is used for all printing methods in which no stable printing molds are impressed on the paper but in which "writing means" are triggered digitally such that they are continuously changed in order to write the pre-determined patterns on the paper. The most current ones of this kind of method are the already outdated matrix printing method, the laser and ink jet method and different thermal methods.

The inventive method with which any sequence of printed products is producible has the following principle: using a digital printing method, the pages of a printed product of the sequence of printed products to be produced are printed onto the front and onto the back of a quasiendless paper web in form of at least one row of juxtaposed printed pages. The juxtaposition of the printed pages means that for normal pages the printed lines are substantially parallel to the length of the paper web. For printing, the paper web is continuously guided through a suitable printing device. After printing the pages of one product, the pages of a following product of the sequence are printed on the paper web, again in the form of one row of juxtaposed pages printed on each side of the web. Before or after printing, the paper web is folded transversely in alternating directions between the pages of the rows of pages to be printed, or of pages already printed, in order to form a folded stack In between the groups of printed pages, of which each forms a printed product of the sequence to be produced, the paper web is separated transversely or is at least brought into an easily separable condition [e.g. perforation or partial separation]. Thus a sequence of Leporello-shaped printed products [i.e. a sequence of printed products having each the form of a folded stack] is produced wherein the first and last pages of successive products are possibly still connected to each other but are easily separable. This kind of printed product can directly, i.e. in the Leporello form, be distributed to the reader or it can, as yet to be shown, be processed further to form various forms of printed products which are per se known.

Because in the digital printing methods the "printing mold" is constantly prepared anew, it is not relevant whether pages or groups of pages printed after one another are identical or not and it is also irrelevant whether identical pages or groups of pages are printed again and again but not in direct succession. This not only means that every degree of individualization is possible but also that, for printed products which comprise a large number of pages, the pages of a product are printed in succession and in an order convenient for further processing such that the further processing can follow the printing on-line.

Apart from the production of the pages with the actual content of the printed product, production of packing addresses and packing slips [stack specific information] or other printed or unprinted additional sheets can be integrated into the inventive method, i.e. such pages can be printed or left unprinted in the sequence of pages to be prepared in predetermined positions according to further processing, such that secondary printing devices, which are usual according to the state of the art for such additions, are not required.

If, e.g., a folded and perforated paper web ["endless" paper] is used for producing a sequence of Leporello-shaped printed products, the separation between the last printed page of a product and the first printed page of the following product is the only further processing step necessary apart from the printing itself. This separation, because it is extremely simple, can even be left to be done by the end-user [reader]. However, with this kind of process the size of page of all printed products possible to be produced is predetermined by the web used.

A newspaper, magazine or brochure in Leporello form with folded edges orientated perpendicular to the printed lines [juxtaposed printed pages] having, e.g., an A4-format in folded condition is a comfortably handleable reading product and is suitable for reproduction of all kinds of different contents such as are usual to newspapers and magazines.

The extremely simple production method of this kind of Leporello-shaped product is extremely suited for decentralized production in which the digital printing data from the most varied sources can be supplied to the most varied production locations, e.g., over the telephone net. This possible decentralization is a further advantage of the inventive method.

BRIEF DESCRIPTION OF THE DRAWINGS

The inventive method and printed products produced according to this method are described in more detail in connection with the following Figures, wherein:

FIGS. 5, 6 and 7 show different organization diagrams for the production and distribution of printed products produced according to the inventive method.

DESCRIPTION OF PREFERRED EMBODIMENTS

Figure 1:
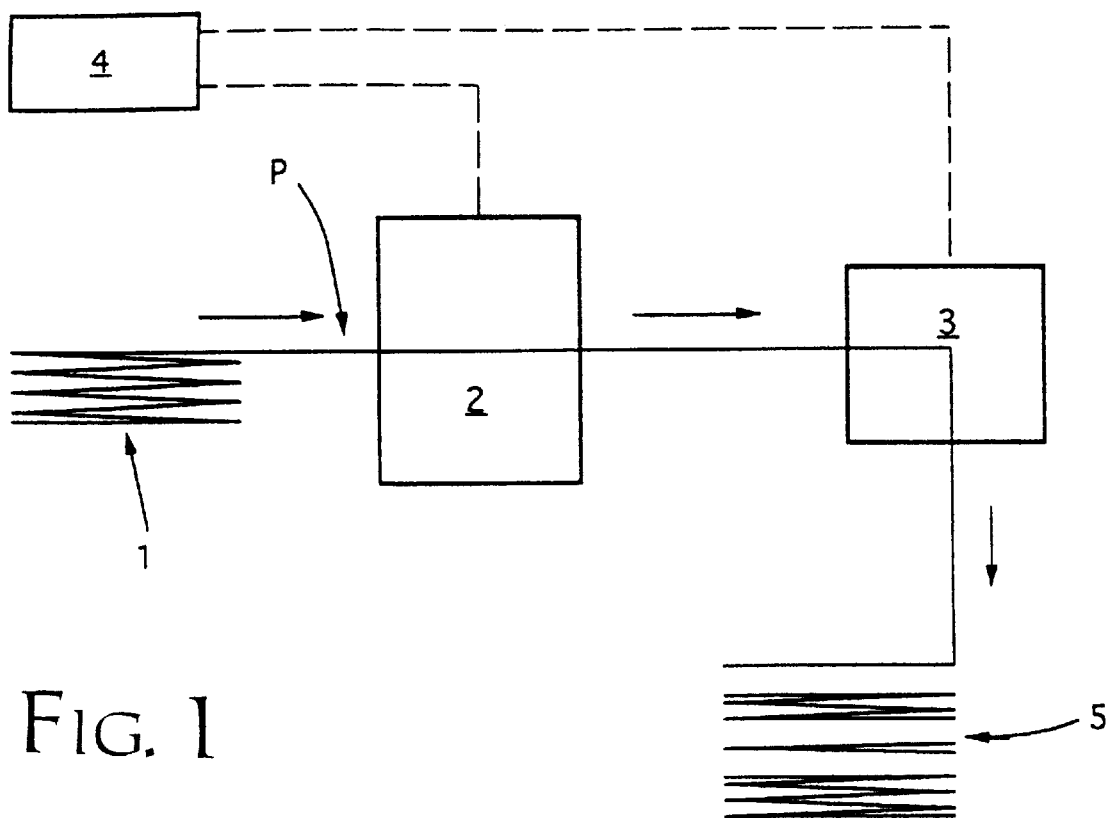
FIGS. 1 and 2 are schematic diagrams of two embodiments of the inventive method.

FIG. 1 shows the simplest embodiment of the inventive method for producing a sequence of printed products. The material used is a quasi-endless web of paper P folded perpendicular to its length in alternating directions, thus forming a folded stack 1. The folded edges of paper web P may additionally be perforated. Paper web P is guided substantially continuously in the direction of the arrows which indicate the direction of movement of the paper when being printed by a printing device 2 for being printed on both sides and into a separating device 3 for separation of each individual printed product from the paper web. The printing device and the separation device are, as shown with broken lines, connected to a computer 4 generating printing and control data through data or control lines respectively. This computer supplies to printing device 2 the printing data for the rows of printed pages to be printed and supplies data for the separation of the individual printed product from paper web P to separation device 3.

The printed products produced with the inventive method represent a predeterminable sequence of Leporello-shaped products 5 with any contents and any number of pages in the form of a folded stack The format of pages is substantially determined by the material [folded paper web] used. This kind of folded stack has the advantage that, due to its folded edges lying opposite to each other comprising each only one layer of paper, it is very stable and thus can be packed without further measure. The Leporello-shaped products may also be packed individually directly after the printing and separating process e.g. bent into a U- or S-form.

Printing device 2 substantially comprises at least two digital printers working according to known principles, each of which printers prints on one side of the paper web P running through the device at least one row of juxtaposed printed pages. One printer is arranged on each side of the paper web advantageously one after the other in the direction of movement of the paper such that they print on one spot on the paper shortly after each other.

The printers e.g. work according to one of the known printing methods such as ink jet method, laser printing method or a thermal method. According to the state of the art, it is possible to print five meters of a paper web per second with this kind of method, i.e. in other words according to the inventive method a Leporello-shaped product with pages of an A4 format and with almost fifty pages is printable in one second, a performance which will surely be possible to increase in the future. Digital methods for multicolor printing are also known which can obviously also be applied to the inventive method.

Computer 4 generating printing and control data substantially corresponds to the state of the art and does not need to be described in further detail here. Already today the preliminary stage of printing, i.e. the writing of contents, the graphic presentation and the layout are often digitalized, whereby the digital data is then used for producing printing molds whereas in the inventive method it is used for controlling the printers.

Computer 4 generating printing and control data substantially looks after the following functions which can also be carried out in a different order. text and image processing for the generation of digital text and image data; laying out and paging for generating data specific to printed products with a page sequence according to the reading order, reordering the data specific to printed products for generating rows of pages for Leporello-shaped printed products or intermediate products; generating the digital data for a sequence of Leporello-shaped printed products whereby mixing data specific to the product-type with data specific to an individual specimen [e.g. addressee-specific]; adding data for additional sheets; generating printer data [e.g. as postscript-file or pixel-file] for rows of pages; generating control data for separation commands and if necessary for folding commands regarding pages of a varying format.

It is conceivable also that the individualization comes into the data generation at an earlier stage than described above. Instead of data for complete printed products [product type specific data], data for single contributions [product part specific data] could e.g. be prepared in the steps for word and image processing and laying out and paging. These data could then be compiled individually when ordered, i.e. processed into data for rows of pages for an individual Leporello-shaped printed product.

Computer 4 generating printing data and control data may consist of the most varied units which may be locally separated from each other. In one part of the units, e.g., data specific to printed product types [whole newspapers or magazines] or specific to sections of printed products [sections of newspapers, magazines] or specific to parts of printed products [contributions, articles, advertising units] are generated while in another part data specific to individual specimen for individual additional sheets and individual parts of content [e.g. addresses] is generated and in still another part data specific to packages or stacks for additional sheets such as package addressee, packing slips etc. is generated. Further units are provided for storage of the printing data from different sources and for mixing and compiling data to form printing queues if they are read out for the printing of a product sequence.

Figure 5:
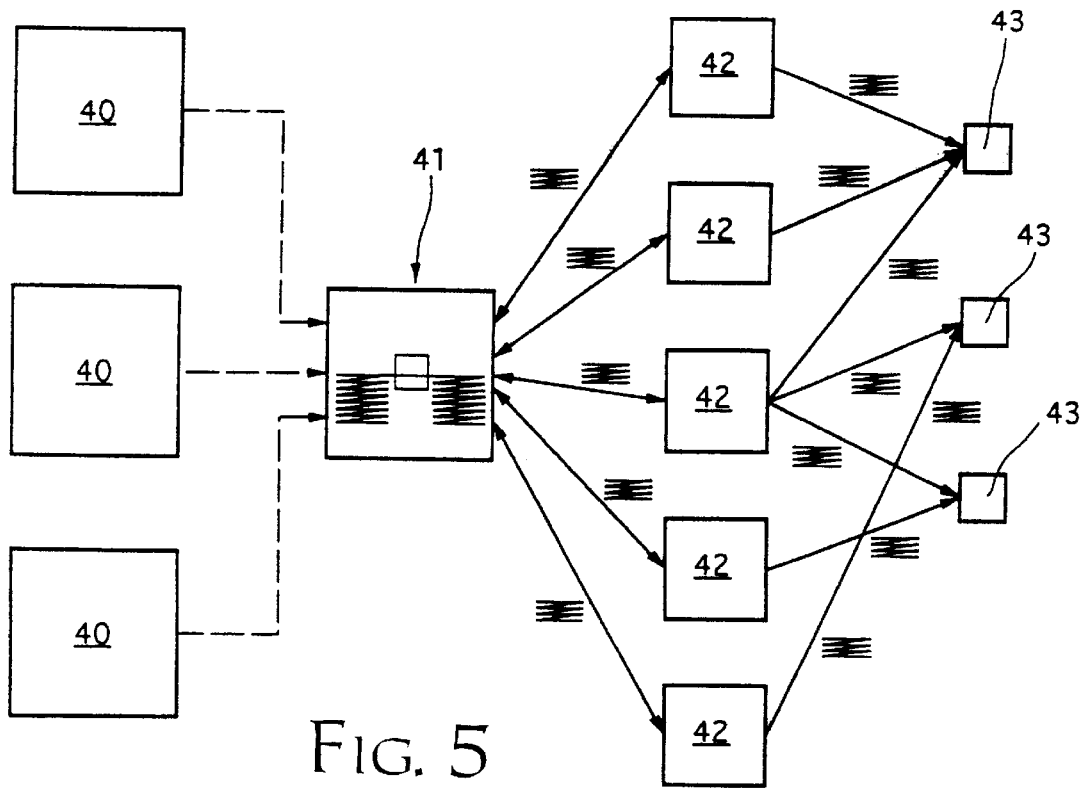
Figure 7:
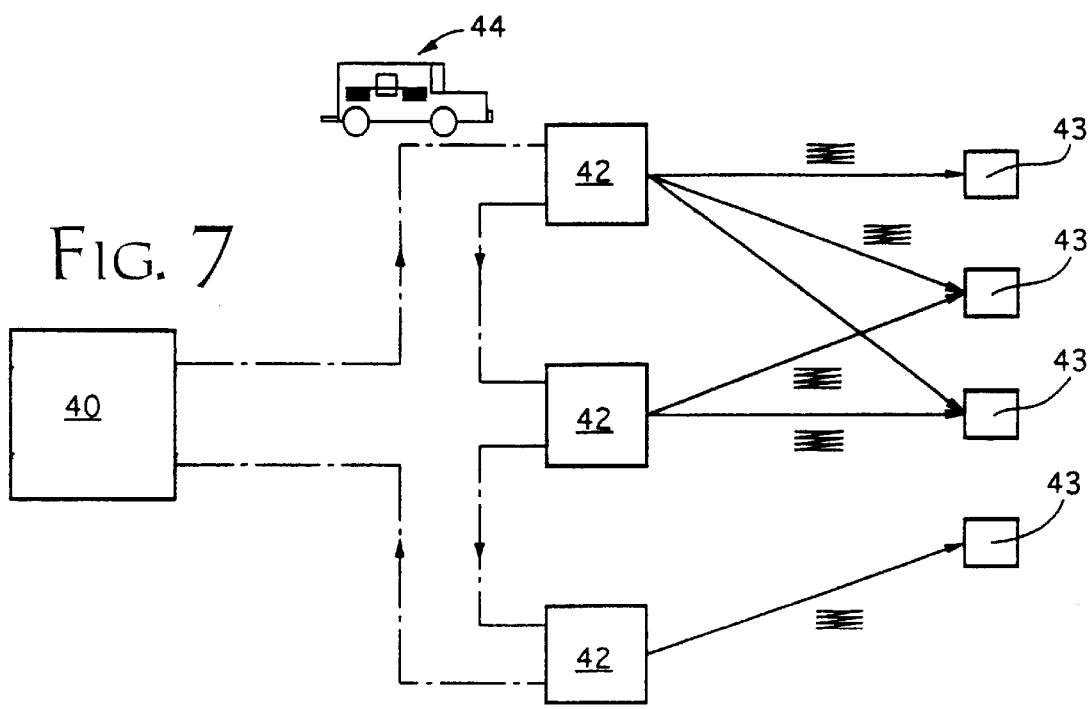

For the function of data lines which may, especially with decentralized methods [see also FIGS. 5 to 7], be long and form a network the telephone net can be used.

Figure 2:
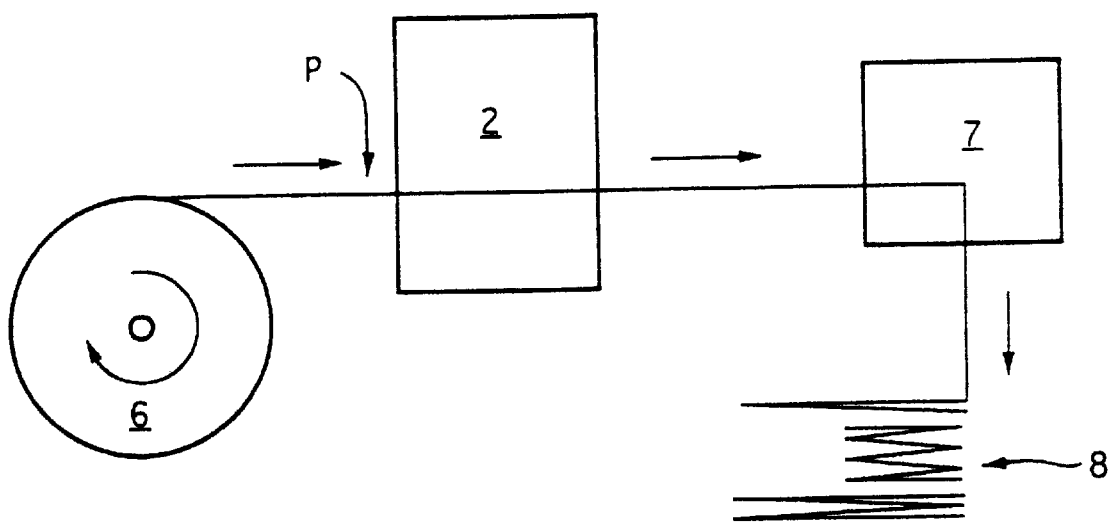

FIG. 2 shows a further embodiment of the inventive method. Contrary to the embodiment of FIG. 1, the paper web P is not supplied from a folded stack but from a roll 6, i.e. the paper web P is not yet folded when it is printed. The paper web P is folded between the printed pages and, if desired, perforated and separated between individual printed products only after printing in a folding and separating station 7. With this method, it is possible to vary the format of the Leporello-shaped product 8 at least in the direction of the length of the paper web. It is possible also to produce products containing pages of different widths. It may, e.g., be advantageous for products which are not to be separated from each other completely to equip them with wider first and last pages which can easily be identified for later separation. Wider pages may also be used as index pages in a product and be printed correspondingly.

As a further embodiment it is also possible to roll up the paper web P again after printing, to transport it in a rolled form and/or store it intermediately and then fold it to a folded stack and separate it into individual printed products after having unrolled it.

A device for folding a paper web into a folded stack is e.g. described in publication DE-3108551. This device is applicable to the inventive method as part of the folding and separating station if the page format stays unchanged. The method described in the same publication uses a folded stack as an intermediate product when producing an edition of identical printed products having all the same number of pages, which method is not comparable to the inventive method.

Figure 3:
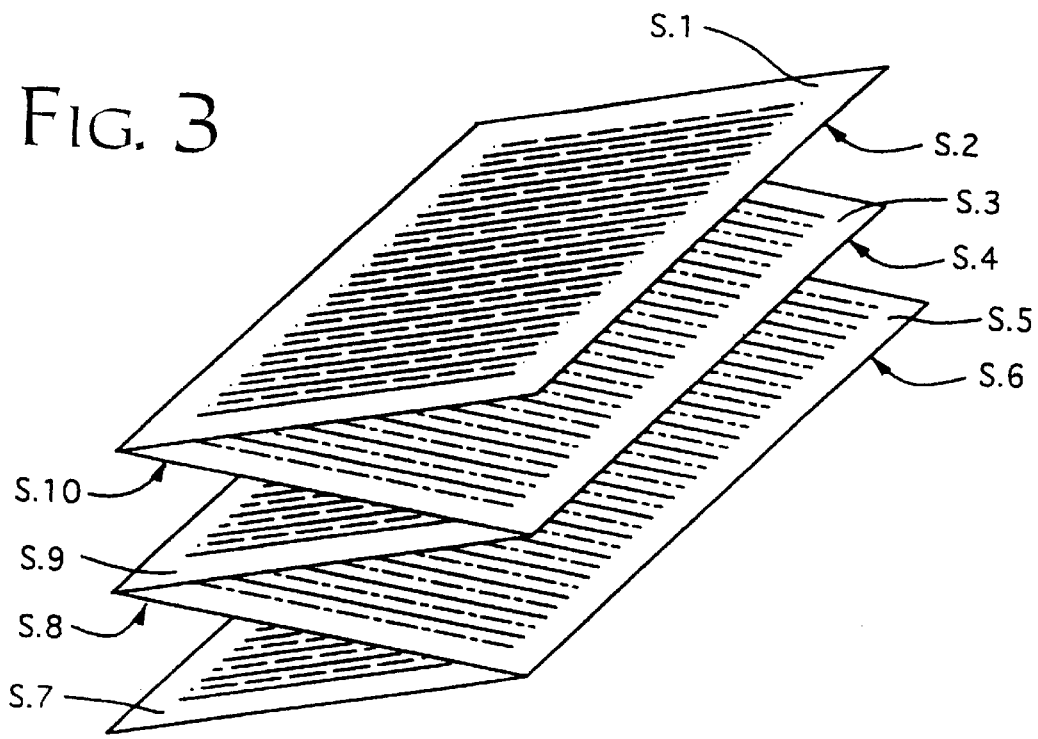
FIG. 3 is a schematic perspective view of a simple Leporello-shaped printed product with five sheets [ten printed pages]

FIG. 3 shows an example of a Leporello-shaped printed product which comprises five sheets connected via folded and possibly perforated edges, i.e. ten printed pages. As can be seen from the Figure the following two rows of printed pages must be printed on the two web sides: front side: page 1 (front page), p. 10, p. 9, p. 8, p. 7; and back side: p. 2, p. 3, p. 4, p. 5, p. 6. This kind of product can be opened and read by the reader very comfortably by first turning over the cover sheet with the title page p. 1 and then turning over one double sheet at a time and after having read one side of the Leporello, by continuing in the same way on the other side. With this arrangement, the printed information can run continuously from one page to the next one at least on pages lying beside each other when the Leporello is open, because the Leporello-shaped product can actually be opened completely [both pages fully visible].

Figure 4:
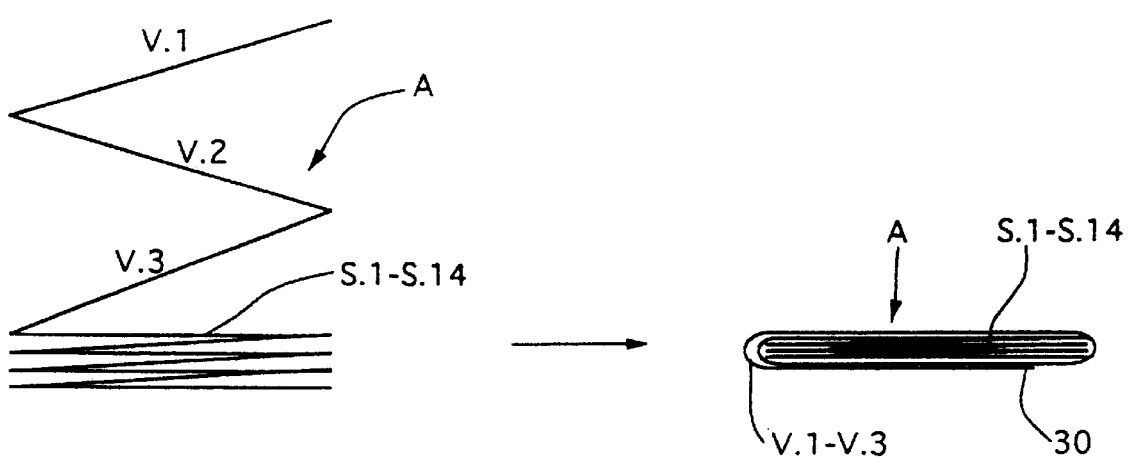
FIG. 4 is a three-part schematic diagram of the formation of a printed product produced according to the inventive method comprising packaging sheets.

FIG. 4 shows a further printed product which is easily producible with the inventive method. It is a Leporello-shaped product which, e.g., comprises seven sheets with fourteen printed pages [p. 1 to p. 14] and which comprises three further sheets connected to the first and the last sheet of the Leporello-shaped product, which further sheets are packing sheets [V.1 to V.3] and may also or may not be folded in the manner of the folded stack. Packing sheet V.2, e.g., carries the individual [specific to specimen] address A for the Leporello-shaped product. Packing sheets V.1 to V.2 are wrapped around the actual Leporello-shaped product in the manner shown on the right side in FIG. 4 and glued together or connected in varying manners [gluing point 30].

Sheets with package addresses and similar additional sheets with or without information specific to specimen or to stack which does not actually belong to the contents of the printed product or the printed products in the stack, can be produced in the same printing method for individual Leporello-shaped printed products or for stacks of Leporello-shaped printed products produced in succession in the same manner, whereby these additional sheets are, at least in a preliminary condition, connected to one of the outermost sheets of one of the products via a folded edge which can be perforated.

FIGS. 5 to 7 very diagrammatically show how different decentralized organizations with printed products are produced according to the inventive method in a predetermined sequence and are distributed.

FIG. 5 shows three publishers 40 where Leporello-shaped printed products or contributions to such printed products are produced in purely digital form [possibly including printing of single print-outs for tests]. From the publishers 40 the printed products or parts of these are delivered to order in digital form to a wholesaler 41. The wholesaler obtains the printing data of the printed products or of parts of printed products in a sequence determined by himself, if necessary mixes it with own data [specific to specimen or to stack] and processes it to printer data with which he controls his own printing device. Of course, the publisher 40 can supply various wholesalers 41 with digital data. The wholesaler 41 delivers the printed products in Leporello-shape or in a form produced from a Leporello-shaped preliminary product to retailers 42 and retrieves products which have not been sold via the same route. The readers 43 buy the products from the retailer 42 and e.g. carry them home to read them there.

FIG. 6 shows a further decentralized organization for production and distribution of printed products. These or parts of these are again produced by publishers 40 in digital form but are then delivered directly to retailers 42.1 who are equipped with printing devices. As the retailers 42.1 need not order printed products before they are demanded by customers but can order them and print them out according to demand, no products which have not been sold must be transported back to a wholesaler. The retailers 42.1 may also be vending machines not requiring any personnel where the reader can order the desired product or desired sequence of contributions directly and have it printed out. With this organization, readers 43.1 who are equipped with a printing device themselves can order the desired products from home or office and print them out themselves.

FIG. 7 shows a further organization for production and delivery of printed products. The products are again produced in digital form by a publisher 40 and printed out in a vehicle 44 which supplies retailers 42, whereby the printing data and the orders of the retailers 42 can at least partly be transmitted to the vehicle 44 by radio.

The organizations shown in FIGS. 5 to 7 for production and distribution of printed products which are produced according to the inventive method can be combined or developed further at choice. Their advantage compared to known organizations which have the same purpose is that the distances of transport and the weight to be transported are reduced, that the products can be brought up to date continuously and that the production can be matched to the demand more easily and more exactly.

What is claimed is:

1. A method for producing a predetermined continuous sequence of copies of newspapers and magazines which are ready for reading, which are comfortably handleable and which are individualized to a freely selectable degree and comprise varying numbers n of printed pages, the method comprising the steps of selectively combining for each copy to be produced data specific to the contents of a newspaper, magazine or parts thereof with data unique to selected individual copies, processing the combined data to form data representing a group of printed pages 1 to n, which group of printed pages consists of a first sequence of juxtaposed pages of page numbers 2, 3, 4 . . . n/2+1 and a second sequence of juxtaposed pages of page numbers 1, n, n−1 . . . n/2+2, printing the first sequence of pages onto one side of a paper web and the second sequence of pages onto the opposite side of the paper web, including printing data common to multiple printed copies and data unique to individual copies in the same printing step, resulting in a plurality of printed copies each having a plurality of pages of a standard size, forming a folded stack of the printed part of the paper web by folding the web in alternating directions at folds across the web between the printed pages, and forming an easily separable separation line across the web between groups of pages representing successive copies by perforating a line across the paper web between each two groups of pages representing two successive copies, whereby each newspaper or magazine copy has data specific to that copy and has a freely selectable volume of material, and wherein the copies of the sequence have varying page numbers; and controlling the steps of printing, folding and perforating to produce pages of greater width at defined locations wherein pairs of pages separated by a perforation line and pairs of pages positioned at preselected opening locations are wider between successive folds than the pages of the standard size, thereby producing an aid for separating copies from a stack containing a plurality of copies and producing an aid for opening the copies at the preselected opening location.

2. A method according to claim 1 wherein the step of printing includes printing onto the paper web a plurality of sequences of printed pages in parallel, followed by separating the paper web in a longitudinal direction between the sequences.

3. A method according to claim 1 wherein the sequences of pages of at least part of the copies additionally comprise at least one unprinted page or one page containing information unique to each individual copy.

4. A method according to claim 3 including the step of wrapping the unprinted page or page with information unique to the individual copy around the folded stack as packing.

5. A method for producing a predetermined continuous sequence of copies of newspapers and magazines which are ready for reading, which are comfortably handleable and which are individualized to a freely selectable degree and comprise varying numbers n of printed pages, the method comprising the steps of selectively combining for each copy to be produced data specific to the contents of a newspaper or magazine or of parts thereof with data unique to selected individual copies, processing the combined data to form data representing a group of printed pages 1 to n, which group of printed pages consists of a first sequence of juxtaposed pages of page numbers 2, 3, 4 . . . n/2+1 and a second sequence of juxtaposed pages of numbers 1, n, n−1 . . . n/2+2, printing a first sequence of pages onto one side of a paper web and a second sequence of pages onto the opposite side of the paper web, including printing data common to multiple copies and data unique to individual copies in the same printing step, resulting in a plurality of printed copies each having a plurality of pages of standard size, forming a separation line across the web between groups of pages representing successive copies, separating from the paper web at the separation lines each group of printed pages representing one copy, forming a folded stack of the printed part of the paper web by folding the web in alternating directions at folds across the web between the printed pages, and controlling the steps of printing, folding and separating to produce pages of greater width at defined locations wherein pairs of pages separated by a separation line and pairs of pages positioned at preselected opening locations are wider between successive folds than the pages of the standard size, thereby producing an aid for separating copies from a stack containing a plurality of copies and producing an aid for opening the copies at the preselected opening locations.

6. A method according to claim 5 wherein the paper web (P) is fed into a printing device from a paper roll, and the step of printing includes printing onto the web pages of different widths and folding the paper web at varying intervals corresponding to the widths of the printed pages.

7. A method according to claim 5 wherein the step of printing includes printing onto the web a plurality of sequences of printed pages in parallel followed by separating the web in a longitudinal direction between the sequences.

8. A method according to claim 5 wherein the sequences of pages of at least part of the copies comprise at least one unprinted page or one page containing information unique to the individual copy.

9. A method according to claim 8 including the step of wrapping the unprinted pages or pages with information unique to the individual copy around the folded stack as packing.

10. A method according to claim 5 wherein the step of printing includes, within groups of printed pages, printing at least one index page having a greater width than the remaining pages.

* * * * *